3,004,436
COOLING MEANS FOR GYROSCOPIC DEVICE
Leonhard Katz, Woburn, Mass., assignor, by mesne assignments, to the United States of America as represented by the Secretary of the Navy
Filed Nov. 16, 1960, Ser. No. 69,776
12 Claims. (Cl. 74—5)

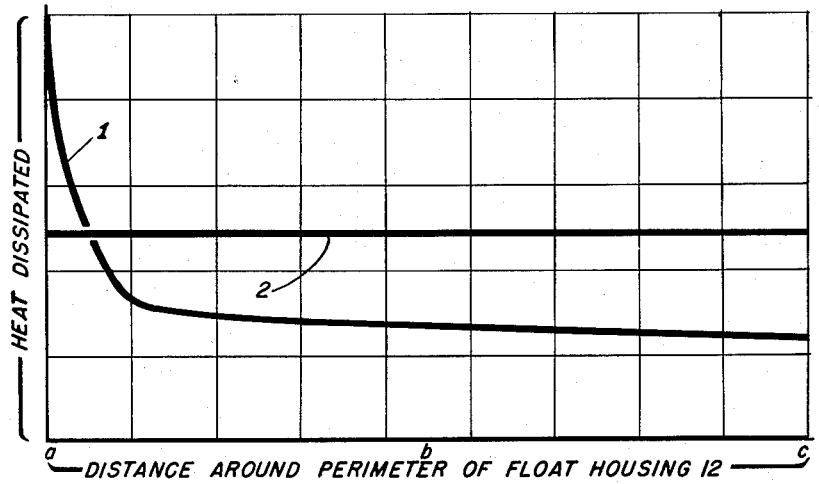
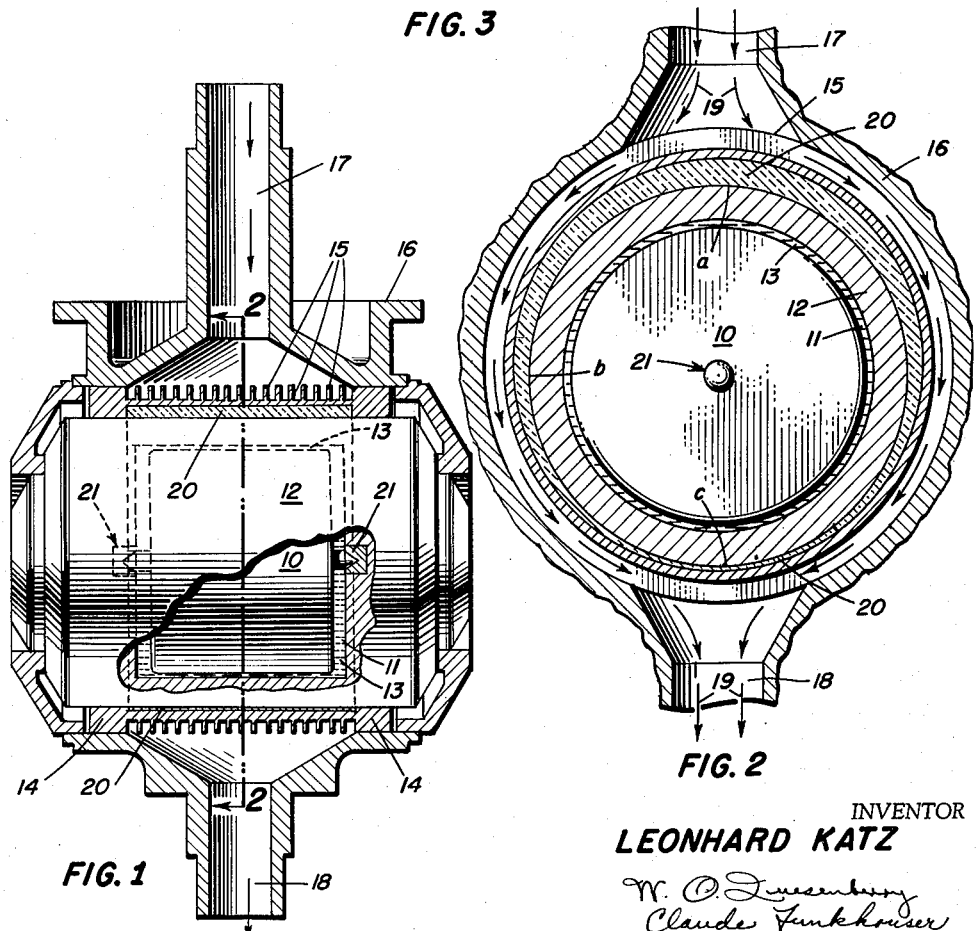

The present invention relates generally to gyroscopic devices and more particularly to means for cooling such a device.

In recent years, enormous amounts of money have been expended on the research and development of highly sensitive gyroscopes. One result of this research and development has been the floating gyroscope the characteristic feature of which is a float assembly or rotor supported with substantially neutral buoyancy in a dense viscous liquid. Gyros of this type are highly resistant to vibration and can withstand stringent environmental conditions because substantially all the weight of the float assembly is supported by the surrounding fluid. Jewelled bearings are normally utilized to guide the float assembly and support only a small fraction of its mass. Notwithstanding their relative immunity to shock and vibration, gyros of the floating type can be made extremely sensitive. When the utmost in sensitivity and precision is desired, it is necessary to consider minor imperfections in the supporting fluid which might influence this sensitivity and precsion. Density and viscosity of the supporting fluid will effect sensitivity and precision of floating gyroscopes and, as both of these characteristics vary with thermal changes such as temperature variations from place to place within the float assembly, and particularly within the damping clearance between the float and its housing, such variations will cause the density and viscosity of the fluid to vary and exert torques on the gyroscope which will then generate false signals.

Heretofore, it has been the practice to enclose within the gyro housing temperature sensitive thermistors to measure the temperature at different points within the gyro and to apply heat generated by resistance coils to the outer surfaces of the gyro to thereby control the temperature distribution within it. The present invention teaches that the thermistor elements and the heater windings may be eliminated from the gyro.

In a typical prior art floating type gyroscope the flow of heat from the float assembly is outward along the rotor axis through the supporting members. Heat flowing outward from the float assembly through the supporting fluid, which is a relatively poor conductor, tends to follow the path across the damping clearance or gap where the fluid layer is thinnest and consequently the thermal impedance the least. The heat flux spreads out to pass out of the gyro assembly substantially through the end connections along the rotor axis of the gyro. Consequently, there is a variation in the temperature of the damping fluid as a function of the distance along the damping gap from one end to the other. So long as this distribution of temperature is symmetrical there is no tendency for the float or rotor to tip and thereby generate false output signals. However, it has been found that in practice the outward flow from one end of the gyroscopes tends to be different from that of the other causing variation in fluid density. Moreover, in a given installation it may be difficult to maintain the outward flow of heat at the ends of the gyro constant because of the comparatively complicated nature of the structure at the gyro ends. Such complex structure is clearly shown in U.S. Patents 2,885,782, and 2,752,791.

Accordingly, an object of the present invention is to provide an improved means for dissipating heat from a gyroscopic device.

Another object of the present invention is to provide a means for eliminating temperature gradients in a gyroscopic device of the floating type.

Yet another object of the present invention is to provide an improved means for dissipating heat from a gyroscopic device which is simple in construction, provides a maximum of reliability, and consumes a minimum of space.

Still a further object of the present invention is to provide a cooling means for a gyroscopic device which requires only a small substantially unidirectional stream of fluid to obviate temperature gradients within such a device.

Other objects and many of the attendant advantages of this invention will be readily appreciated as the same becomes better understood by reference to the following detailed description when considered in connection with the accompanying drawings wherein:

FIG. 1 is a vertical section view of the present invention;

FIG. 2 is a section view taken along a line substantially corresponding to line 2—2 of FIG. 1; and FIG. 3 is a comparative graphical illustration of heat dissipated by a gyroscope constructed in accordance with the present invention and one not so constructed.

FIG. 1 illustrates one embodiment of the present invention wherein a float assembly or rotor 10 is rotatably mounted in a gyroscopic device. Float assembly 10 is a heat source due to the heat generated by its rotation and by the electrical means, not shown, utilized to effect this rotation. Damping or clearance space 11 between the float assembly 10 and the float assembly housing 12 is filled with the dense viscous fluid 13 which supports the rotor 10. For cooling purposes float housing 12 is surrounded by a metal sleeve 14 in which are milled cooling fins 15. The sleeve 14 is securely mounted in the gyro body 16 which completely encloses the cooling fins 15. Cooling air is circulated down the passageway 17 in the gyro body 16, around the sleeve 14, and then out through passageway 18 in the lower portion of the gyro body 16 as shown in FIG. 2 by arrows 19. Jewelled guide means or bearings 21 guide the rotor 10 in housing 12.

As the cooling air passes through the inlet passage 17 and around the sleeve 14 having milled cooling fins 15 thereon, it is warmed as it dissipates heat from the sleeve 14. Consequently, the heat dissipated at the point $a$ (see FIG. 2) on the outer portion of the housing 12 is much greater than at points $b$ or $c$ due to the decreasing temperature differential. More specifically, since the temperature of the air flowing adjacent point $b$ has already been heated by cooling the surface between $a$ and $b$, the temperature differential decreases as the air proceeds around the cooling sleve 14 to the outlet 28. To equalize the temperature differential at every point around the circumference of the sleeve 14, a shim or eccentric sleeve 20 made of a relatively poor conducting plastic material, for example Bakelite, is interposed between the gyro body 16 and the cooling sleeve 14 as shown in FIGS. 1 and 2. This sleeve is slightly wider than the sides of the float assembly 10. The heat dissipated at each point on the cooling sleeve 14 will be controlled by sleeve 20 in a manner to provide a constant temperature differential between the sleeve 14 and every point on the surface of housing 12.

FIG. 3 of the drawing illustrates graphically the comparative performance of the eccentric sleeve 20. Curve 1 illustrates the performance of a gyro cooling system without the eccentric cooling sleeve 20. Points $a$, $b$, and $c$ along the abscissa of the graph represent the points $a$, $b$, and $c$ around the float housing 12 as shown in FIG. 2 while the ordinate axis represents the amount of heat dissipated. Curve 1 illustrates the rate at which heat is dissipated from a gyroscopic device which does not utilize an eccentric sleeve 20. As illustrated, without the sleeve 20, the heat dissipation quickly drops off as the cooling air moves around the cooling sleeve 14 from point $a$ toward points $b$ and $c$. Curve 2 illustrates the vastly improved performance of the present invention wherein the amount of heat dissipated from the float housing is identical at every point around the outer surface of cooling sleeve 14.

The thickness of $X_n$ at any point $n$ on the eccentric sleeve 20 can be readily calculated by the formula $$Q = \frac{K \cdot dt_n \cdot A}{x_n} \quad (1)$$

where Q is the heat to be dissipated from the float assembly; K is the thermal conductivity of the eccentric sleeve material; $dt_n$ is the temperature differential existing, before the sleeve 20 is inserted, between the air temperature at the point $n$ and the air outlet point $c$; and A is the area of the surface through which heat Q is being dissipated. The eccentric sleeve thickness at point $c$ must be determined before the thickness at any other point $n$ on the sleeve can be determined. Since this point is nearest the air outlet the cooling air passing thereover will be at its maximum temperature and consequently the thickness of sleeve 20 at this point is ideally zero so as not to impair the outward flow of heat. As a practical matter, however, this thickness $X_c$ is usually dictated by manufacturing and handling procedures which require some thickness at this point.

Although the thickness $X_c$ has no purpose other than to facilitate manufacturing and handling its effect must be considered in determining the thickness of the eccentric sleeve 20 at any point $n$. In effect, thickness $X_c$ is added to the thickness at any point $X_n$. The temperature differential $dt_c$ caused by the thickness $X_c$ may be readily calculated by use of Equation 1.

The temperature differential $dt_n$ is the gradient which the eccentric sleeve 20 must neutralize. Because the temperature differential $dt_c$ effects equally the heat dissipation at every point on the sleeve 20 is must be added to $dt_n$ in order to obtain a true value of $X_n$. The same result could be obtained by calculating the thickness $X_n$ by using the temperature differential $dt_n$ and adding $X_c$ thereto.

For example, suppose a Bakelite sleeve is utilized which has a thermal conductivity K of .1 B.t.u./hr. ft. °F., the sleeve thickness $X_c$ at point $c$ is determined to be .005 in. and $Q/A$ equals .3 watt/in.² The temperature differential $dt_c$ at point $c$ is determined to be .61° F. By experimentation, it is found that, before sleeve 20 is positioned around the float housing 12, the temperature differential $dt_a$ between cooling air at point $a$ and point $c$ is 2.42° F. Adding $dt_c$ thereto 3.03° F. is obtained. Then using Equation 1 to calculate thickness at point $a$, it is determined that this value is .025 inch. Similarly, the temperature differential $dt_n$ between the air outlet, point $c$, and point $n$ can be determined experimentally and utilized to determine the thickness of the sleeve 20 at that point.

Elimination of the circumferential nonuniformity in temperature in the damping gap 11 by means of the eccentric sleeve 20 is much more important than eliminating axial variations in temperature because the temperature effects gyro performance both through its influence on density and its influence on viscosity. It is apparent that, if density and viscosity of the damping fluid on opposite sides of the float are unequal, the reaction on the output rotation of the float about the output axis is not a pure couple thereby causing displacement of the float which, in turn, causes unreliable performance. In the manner just described, the present invention reduces temperature differentials within a floating gyro thereby insuring an accurate and reliable output signal.

Obviously many modifications and variations of the present invention are possible in the light of the above teachings. It is therefore to be understood that within the scope of the appended claims the invention may be practiced otherwise than as specifically described.

What is claimed is:

1. A gyroscopic device comprising a cylindrical housing, a cylindrical rotor rotatably and concentrically mounted in said housing with a clearance space between said rotor and said housing, said space being filled with a dense viscous fluid, an eccentric sleeve having a varying thickness and constructed of a poor heat conducting material surrounding the sides of said cylindrical housing and in intimate contact therewith whereby the heat flowing through said sleeve to or from said housing varies with thickness of said sleeve.

2. The device set forth in claim 1 wherein a cooling means surrounds said eccentric sleeve and is in intimate contact therewith, said cooling means being capable of rapidly conducting heat.

3. The device set forth in claim 1 wherein said eccentric sleeve has a substantially uniform internal radius and a thickness equal to $X_n$ plus $X_c$ where $X_c$ is any desired minimum thickness and $X_n$ equals $$K \frac{A dt_n}{Q}$$

where K is the thermal conductivity of the sleeve material, A is the outer circumferential area of said housing, Q is the heat that is to be dissipated through said area, and $dt_n$ is the temperature gradient which exists between a reference point on the outer circumference of the housing and the point for which the sleeve thickness is being determined.

4. The device set forth in claim 2 wherein mounting means are positioned around said cooling sleeve to enable the mounting of said gyroscope without substantial interference with said cooling means.

5. Cooling means for a floating gyroscopic device having a rotor rotatably mounted in a cylindrical housing and comprising an eccentric sleeve constructed of a relatively poor heat conducting material and positioned concentrically around and in intimate contact with the sides of said housing, and a heat exchanger sleeve surrounding and in intimate contact with said eccentric sleeve, said heat exchanger sleeve having cooling fins radially projecting from the outer surface thereof.

6. The device set forth in claim 5 wherein said eccentric sleeve has a thickness which equals $X_n$ plus $X_c$ where $X_c$ is any desired minimum thickness and $X_n$ equals $$K \frac{A dt}{Q}$$

where K is a constant, A is the area of the sides of said housing, Q is the heat that is transferred through said sides of said housing, and $dt$ is the temperature gradient which exists between point $X_c$ and the point for which the thickness of said sleeve is being computed.

7. In combination with a floating gyroscopic device comprising, a cylindrical housing enclosing a mass of dense viscous liquid, a rotor rotatably and concentrically positioned in said housing and substantially supported by said liquid, said device generating heat when in operation, the improvement comprising an eccentric sleeve of a substantially non-heat conducting material positioned around the sides of said housing and in intimate contact therewith, said sleeve having a constant internal radius and a thickness which varies in a plane perpendicular to its axis whereby when cooling fluid passes around said sleeve said fluid remains at a constant temperature throughout.

8. The device as set forth in claim 7 wherein a cooling sleeve surrounds said eccentric sleeve and is in intimate contact therewith, said cooling sleeve having radial cooling fins projecting therefrom.

9. The device as set forth in claim 8 wherein said cooling sleeve is securely mounted in a gyro body member.

10. In a gyroscope device including a rotatable float assembly supported by a dense viscous liquid in a gyro housing, said float assembly having its movement guided by jewelled bearings mounted in said housing, the improvement comprising an eccentric sleeve surrounding the gyro housing, a gyro body assembly having said gyro housing rigidly positioned therein, said body having first means for conducting cooling fluid to, around, and from said sleeve, said first means having an inlet and an outlet, said sleeve having a thickness at any point $X_n$ equal to $$\frac{KA\,dt_n}{Q}$$

where $K$ is the thermal conductivity of the eccentric sleeve material $Q$ is the heat to be dissipated from the gyro housing, $A$ is the inner surface area of said eccentric sleeve and through which the heat $Q$ will be dissipated, and $dt_n$ is the temperature difference of said cooling fluid between said outlet and said point $X_n$.

11. The improvement set forth in claim 10 wherein said sleeve has a minimum thickness $X_c$ at the point nearest said outlet, said thickness $X_n$ having a thickness $X_c$ added thereto.

12. The device set forth in claim 10 wherein a cooling sleeve having cooling fins thereon is positioned around said eccentric sleeve and is in intimate contact therewith.

References Cited in the file of this patent

UNITED STATES PATENTS

| | | |
|---|---|---|
| 2,406,552 | Lucke | Aug. 27, 1946 |
| 2,420,373 | Hogberg | May 13, 1947 |